United States Patent
Hayase (10) Patent No.: US 8,947,293 B2
(45) Date of Patent: Feb. 3, 2015

(54) RADAR APPARATUS

(75) Inventor: Kei Hayase, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 719 days.

(21) Appl. No.: 13/206,099

(22) Filed: Aug. 9, 2011

(65) Prior Publication Data

US 2012/0235859 A1 Sep. 20, 2012

(30) Foreign Application Priority Data

Mar. 16, 2011 (JP) ................................. 2011-057851

(51) Int. Cl.
*G01S 13/00* (2006.01)
*G01S 7/40* (2006.01)
G01S 13/34 (2006.01)
G01S 13/93 (2006.01)

(52) U.S. Cl.
CPC .............. *G01S 7/4008* (2013.01); *G01S 13/34* (2013.01); *G01S 13/931* (2013.01); *G01S 2013/9321* (2013.01); *G01S 2013/9325* (2013.01)
USPC ....................................................... 342/70

(58) Field of Classification Search
CPC ... G01S 13/931; G01S 13/34; G01S 13/9321; G01S 13/9325
USPC ........................................................ 342/70
See application file for complete search history.

(56) References Cited

U.S. PATENT DOCUMENTS

| 4,520,361 | A | * | 5/1985 | Frazita | 342/372 |
| 4,949,090 | A | * | 8/1990 | Tamii et al. | 342/173 |
| 5,294,934 | A | * | 3/1994 | Matsumoto | 342/173 |
| 8,610,618 | B2 | * | 12/2013 | Provost et al. | 342/29 |

FOREIGN PATENT DOCUMENTS

| CN | 1898578 A | 1/2007 |
| JP | 2007-171162 A | 7/2007 |
| JP | 2008-202244 A | 12/2008 |

OTHER PUBLICATIONS

Japanese Office Action issued on Mar. 19, 2013 in Japanese Patent Application No. 2011-057851.
Office Action in Chinese Patent Application No. 201110306893.9 mailed May 5, 2014.

* cited by examiner

*Primary Examiner* — Frank J McGue
(74) *Attorney, Agent, or Firm* — Sughrue Mion, PLLC; Richard C. Turner (57) ABSTRACT

Provided is a radar apparatus that can detect the failure of the transmission switch. The radar apparatus includes: a plurality of transmission antennas; transmission switches that select a transmission antenna for transmitting an electromagnetic wave from among the plurality of transmission antennas; a plurality of reception antennas that receive a reflected wave which is the electromagnetic wave reflected from a target as a reception signal; a signal processing unit that detects the target based on a sampling signal obtained by sampling the reception signal; and a failure judgment unit that compares first reception signals transmitted from one of the plurality of transmission antennas and received by the plurality of reception antennas, with second reception signals transmitted from another of the plurality of transmission antennas and received by the plurality of reception antennas, and judges whether or not any one of the transmission switches has failed based on a comparison result.

21 Claims, 5 Drawing Sheets

RADAR APPARATUS

BACKGROUND OF THE INVENTION

1. Field of the Invention

The present invention relates to a radar apparatus which is to be mounted on, for example, a vehicle, for switching from one of a plurality of transmission antennas to another to transmit a transmission signal as an electromagnetic wave, receiving the electromagnetic wave reflected from a target as a reception signal by a reception antenna, and detecting a distance to the target, a relative velocity to the target, and an angle to the target based on a reception signal.

2. Description of the Related Art

As one of the radar apparatus mounted on a vehicle and used in vehicle velocity/inter-vehicle control (such as adaptive cruise control (ACC)) or a collision mitigation brake system, there has been known a radar apparatus of a frequency modulated continuous wave (FMCW) system (hereinafter, referred to as "FMCW radar apparatus"), which can detect a distance to a target and a relative velocity to the target at the same time.

The FMCW system is one of the radar transmitting systems, and can calculate a distance to an object (target) and a relative velocity to the target by calculating a difference in frequency between a transmission wave and a reception wave (transmission wave reflected from the target).

The FMCW radar is obtained by subjecting a transmission signal of a continuous wave (CW) radar to FM modulation. That is, in the FMCW radar apparatus, a frequency of an oscillator is modulated by a triangular wave into a transmission signal which is radiated from the transmission antenna to the external. Further, the reception signal received by the reception antenna, which is the transmission signal reflected from the target, is subjected to a time lag caused by the distance to the target and a frequency shift corresponding to the relative velocity to the target.

Subsequently, the reception signal subjected to the frequency shift is mixed with the transmission signal, thereby obtaining a beat signal. Then, abeat frequency in an increasing chirp (up-chirp) where the frequency increases and a beat frequency in a decreasing chirp (down-chirp) where the frequency decreases are measured separately in each modulation cycle, thereby calculating the distance to the target and the relative velocity to the target. This technology is generally used in the FMCW radar apparatus, and is a known technology.

On the other hand, in order to detect an angle to the target, that is, an arrival angle of the reception wave, there has been known a method in which a plurality of antennas spatially arranged at different positions are used. As examples of such method, there have been known methods of Multiple Signal Classification (MUSIC) and Estimation of Signal Parameters via Rotational Invariance Techniques (ESPRIT).

In those angle calculating methods using a phase, it is known that more excellent angle resolution is generally obtained as the antenna aperture size is larger. However, when there is such a limit that the radar apparatus is located in a restricted space, the obtained angle resolution is limited. For that reason, a countermeasure is applied in which two transmission antennas are disposed on both ends of the plurality of reception antennas, an electromagnetic wave is transmitted in a time sharing manner while switching between those two transmission antennas, and an equivalent aperture about twice as large as the normal aperture is realized by using the respective reception results.

In the radar apparatus thus configured, when a transmission switch that switches between the two transmission antennas to select the transmission antenna for transmitting the electromagnetic wave has failed, and is fixed to an always-on or an always-off, the distance to the target and the relative velocity to the target can be normally calculated whereas the angle to the target cannot be normally calculated. That is, although an erroneous angle to the target is calculated, the calculation per se of the angle to the target can be performed. Therefore, it is difficult to detect a failure of the transmission switch.

There is known a radar apparatus which includes a plurality of transmission and reception antennas, and a plurality of transmission and reception switches that are disposed for the transmission and reception antennas so as to switch from one of the transmission and reception antennas to another, in which the transmission and reception switches are sequentially switched to compare levels of the reception signals of the respective transmission and reception antennas with each other, and the failure of the transmission and reception switches is detected based on the comparison results (see, for example, Japanese Patent Application Laid-open No. 2007-171162).

However, the related art suffers from the following problems.

That is, when the plurality of transmission and reception antennas and the plurality of transmission and reception switches are provided as in the radar apparatus disclosed in Japanese Patent Application Laid-open No. 2007-171162, all the combinations of transmission and reception of the transmission and reception antennas are executed to detect the failure of the transmission and reception switches.

On the other hand, in a radar apparatus having a plurality of transmission antennas and a plurality of transmission switches instead of the plurality of transmission and reception antennas and the plurality of transmission and reception switches, the transmission switches contribute to only the transmission of the electromagnetic wave, and the reception antennas are always in a reception state. Therefore, it is difficult to detect the failure of the transmission switches.

For example, consider a case where two transmission antennas (first transmission antenna and second transmission antenna) and two reception antennas are arranged, and a first transmission switch that selects the first transmission antenna is fixed to an on-state. In this case, an electromagnetic wave normally transmitted from the first transmission antenna is received by the two reception antennas in a transmission period of the first transmission antenna. However, in a transmission period of the second transmission antenna, electromagnetic waves transmitted from the first transmission antenna and the second transmission antenna at the same time are combined and received by the two reception antennas. In this case, it is difficult to detect the fixed on-state of the transmission switch by only the combination of switching of the transmission switches.

SUMMARY OF THE INVENTION

The present invention has been made to solve the above-mentioned problems, and has an object of providing a radar apparatus that includes a plurality of transmission antennas and transmission switches that select a transmission antenna for transmiting an electromagnetic wave, so as to detect the failure of the transmission switch.

A radar apparatus of the present invention includes: a plurality of transmission antennas; transmission switches that select a transmission antenna for transmitting an electromagnetic wave from among the plurality of transmission antennas; a plurality of reception antennas that receive a reflected wave which is the electromagnetic wave reflected from a target as a reception signal; a signal processing unit that detects the target based on a sampling signal obtained by sampling the reception signal; and a failure judgment unit that compares first reception signals transmitted from one of the plurality of transmission antennas and received by the plurality of reception antennas, with second reception signals transmitted from another of the plurality of transmission antennas and received by the plurality of reception antennas, and judges whether or not any one of the transmission switches has failed based on a comparison result.

According to the radar apparatus of the present invention, the failure judgment unit compares the first reception signals transmitted from one of the plurality of transmission antennas and received by the plurality of reception antennas, with the second reception signals transmitted from another of the plurality of transmission antennas and received by the plurality of reception antennas, and judges whether or not any one of the transmission switches that selects the transmission antenna for transmitting the electromagnetic wave has failed based on the comparison result.

Therefore, it is possible to detect the failure of the transmission switch.

DETAILED DESCRIPTION OF THE PREFERRED EMBODIMENTS

Hereinafter, radar apparatus according to preferred embodiments of the present invention are described with reference to the accompanying drawings. In the respective drawings, the same or corresponding parts are denoted by identical symbols for description. In the following embodiments, a case in which the radar apparatus is mounted in a vehicle is exemplified. Further, in the following embodiments, two transmission antennas and two reception antennas are provided as an example. However, the number of transmission antennas and the number of reception antennas may be three or more.

First Embodiment

Figure 1:
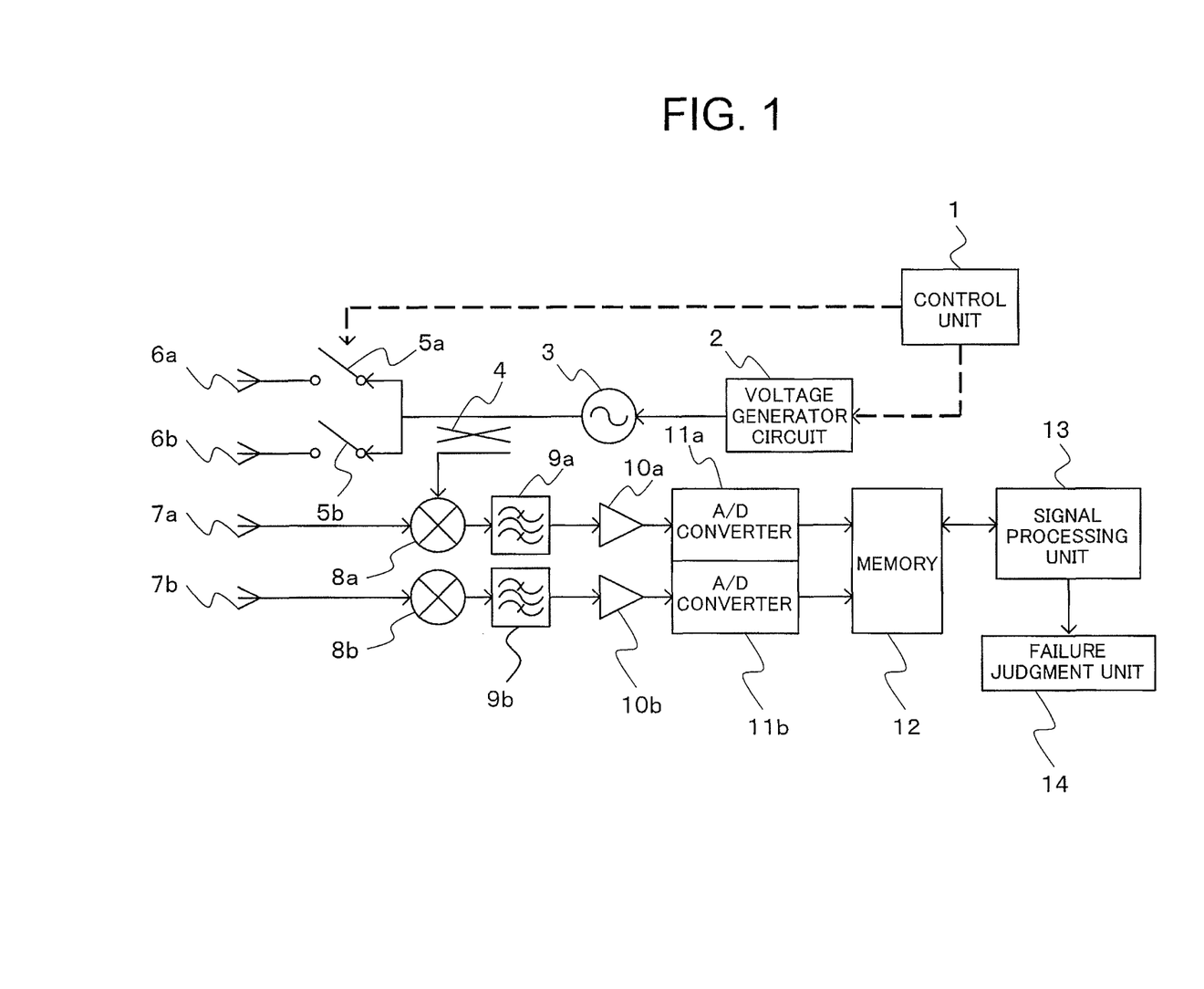
FIG. 1 is a block configuration diagram illustrating a radar apparatus according to a first embodiment of the present invention.

FIG. 1 is a block configuration diagram illustrating a radar apparatus according to a first embodiment of the present invention. Referring to FIG. 1, the radar apparatus includes a control unit 1, a voltage generator circuit 2, a voltage controlled oscillator (VCO) 3 (hereinafter, referred to as "VCO 3"), a distributor 4, transmission switches 5a and 5b, transmission antennas 6a and 6b, reception antennas 7a and 7b, mixers 8a and 8b, band pass filters 9a and 9b, amplifiers 10a and 10b, analog to digital (A/D) converters 11a and 11b, a memory 12, a signal processing unit 13, and a failure judgment unit 14.

The control unit 1 outputs a control signal such as a timing signal to the voltage generator circuit 2 and the transmission switches 5a and 5b to control the operation thereof. The voltage generator circuit 2 generates a voltage having frequency modulation chirps of triangular waves with time in response to the control signal from the control unit 1, and outputs the voltage to the VCO 3. In the triangular wave frequency modulation, a chirp in which the frequency increases with time is referred to as "up phase", and a chirp in which the frequency decreases with time is referred to as "down phase".

The VCO 3 generates a transmission signal whose oscillation frequency is temporally up-modulated and down-modulated in response to the voltage from the voltage generator circuit 2, and outputs the transmission signals to the distributor 4. The distributor 4 distributes and outputs the transmission signal from the VCO 3 to the transmission switches 5a and 5b and the mixers 8a and 8b. The transmission switches 5a and 5b are alternately turned on and off in response to the control signal from the control unit 1 to select one of the transmission antennas 6a and 6b for transmitting an electromagnetic wave, and output the transmission signal from the distributor 4. The transmission antennas 6a and 6b transmit the transmission signals from the transmission switches 5a and 5b to the periphery as transmission waves (electromagnetic waves), respectively.

The reception antennas 7a and 7b receive respective reflected waves which are the transmission waves reflected by a target as reception signals, and output the reception signals to the mixers 8a and 8b, respectively. The mixers 8a and 8b mix the transmission signals from the distributor 4 with the reception signals from the reception antennas 7a and 7b, respectively, generate beat signals, and output the beat signals to the band pass filters 9a and 9b. The band pass filters 9a and 9b extract signals of desired bands from the beat signals from the mixers 8a and 8b, and output the signals to the amplifiers 10a and 10b, respectively.

The amplifiers 10a and 10b amplify the beat signals from the band pass filters 9a and 9b, and output the amplified beat signals to the A/D converters 11a and 11b, respectively. The A/D converters 11a and 11b convert (sample) the beat signals from the amplifiers 10a and 10b from analog signals to digital signals, respectively, and output the digital signals to the memory 12. The memory 12 stores the beat signals sampled by the A/D converters 11a and 11b.

The signal processing unit 13 includes, for example, a central processing unit (CPU), a CPU and a digital signal processor (DSP), a field programmable gate array (FPGA), or an application specific integrated circuit (ASIC).

Further, the signal processing unit 13 calculates a distance to a target, a relative velocity to the target, and an angle to the target based on the beat signals stored in the memory 12. Specifically, at a time when a measurement time of the up phase or the down phase is terminated, the signal processing unit 13 receives a digital voltage value of the beat signal in the up phase or a digital voltage value of the beat signal in the down phase. The signal processing unit 13 then calculates the distance to the target, the relative velocity to the target, and the angle to the target and outputs the calculated results to the memory 12 and the failure judgment unit 14.

The failure judgment unit 14 compares the reception signals (first reception signal and second reception signal) received by the reception antennas 7a and 7b with each other with respect to the transmission waves transmitted from the different transmission antennas 6a and 6b. The failure judgment unit 14 then executes a failure judgment of the transmission switches 5a and 5b based on the comparison results.

Next, processing of calculating the distance to the target, the relative velocity to the target, and the angle to the target in the radar apparatus according to the first embodiment of the present invention is described with reference to a flowchart of FIG. 2.

First, the memory 12 stores sampling data of the beat signals in the up phase and the down phase (Step S21). In this step, the beat signals are alternately stored with respect to the transmission waves transmitted from the transmission antennas 6a and 6b. In this example, it is assumed that the respective beat signals of the reception signals transmitted from the transmission antenna 6a and received by the reception antennas 7a and 7b are Raa and Rab, and the respective beat signals of the reception signals transmitted from the transmission antenna 6b and received by the reception antennas 7a and 7b are Rba and Rbb.

Subsequently, the signal processing unit 13 reads the beat signals Raa, Rab, Rba, and Rbb stored in Step S21 from the memory (Step S22).

Subsequently, the signal processing unit 13 executes, for example, a fast Fourier transformer (FFT) on the beat signals read from the memory 12 in Step S22, transforms the beat signals into frequency spectrums, and stores the transformed frequency spectrums in the memory 12 (Step S23). Here, for a frequency transform, a discrete Fourier transform (DFT) may be used. In this case, it is assumed that the frequency spectrums of the beat signals Raa, Rab, Rba, and Rbb are Faa, Fab, Fba, and Fbb, respectively.

Subsequently, the signal processing unit 13 executes a peak detection processing for the frequency spectrum (that is, beat frequency) obtained in Step S23 (Step S24). In this step, the frequency spectrums Faa, Fab, Fba, and Fbb transmitted by the different transmission antennas 6a and 6b and received by the different reception antennas 7a and 7b are generally added to improve a signal to noise ratio (SNR) of the signal in the peak detection.

Subsequently, the signal processing unit 13 calculates the distance to the target and the relative velocity to the target based on the peak beat frequencies in the up phase and the down phase (Step S25).

Subsequently, the signal processing unit 13 extracts spectrums Faat, Fabt, Fbat, and Fbbt (frequency analysis signals) corresponding to the peak beat frequencies used in calculating the distance to the target and the relative velocity to the target, from the frequency spectrums Faa, Fab, Fba, and Fbb. Then, the signal processing unit 13 stores those spectrums in the memory 12, calculates the angle to the target through arrival angle estimation processing (Step S26), and completes the processing of FIG. 2.

Subsequently, the principle of the failure detection for the transmission switches 5a and 5b is described.

First, it is assumed that the respective phase components of the spectrums Faat, Fabt, Fbat, and Fbbt corresponding to the peak beat frequencies used in calculating the distance to the target and the relative velocity to the target are Paat, Pabt, Pbat, and Pbbt. In this example, when the transmission switches 5a and 5b are normally turned on or off, Paat, Pabt, Pbat, and Pbbt satisfy relationships of the following Expressions (1) and (2).

$$Pabt = Paat + \Delta\theta \tag{1}$$

$$Pbbt = Pbat + \Delta\theta \tag{2}$$

In Expressions (1) and (2), $\Delta\theta$ represents a phase difference attributable to an interval of the reception antennas 7a and 7b. Similarly, Paat and Pbat satisfy given relationships due to the arrangement of the transmission antennas 6a and 6b and the reception antennas 7a and 7b, which are omitted herein.

Further, it is assumed that a phase difference of the reception signals transmitted from the transmission antenna 6a and received by the reception antennas 7a and 7b is $\Delta$Pat, and a phase difference of the reception signals transmitted from the transmission antenna 6b and received by the reception antennas 7a and 7b is $\Delta$Pbt. Then, $\Delta$Pat and $\Delta$Pbt are represented by the following Expressions (3) and (4), respectively.

$$\Delta Pat = Paat - Pabt = Paat - (Paat + \Delta\theta) = -\Delta\theta \tag{3}$$

$$\Delta Pbt = Pbat - Pbbt = Pbat - (Pbat + \Delta\theta) = -\Delta\theta \tag{4}$$

It is found from Expressions (3) and (4) that $\Delta$Pat and $\Delta$Pbt have the same value.

Consider a case where the transmission switch 5a is fixed to the on-state. In this case, in the transmission timing of the transmission antenna 6a, the transmission wave is normally transmitted from only the transmission antenna 6a. However, in the transmission timing of the transmission antenna 6b, the transmission waves are transmitted from the transmission antennas 6a and 6b at the same time. Therefore, Paat, Pabt, Pbat, and Pbbt satisfy relationships of the following Expressions (5) and (6).

$$Pabt = Paat + \Delta\theta \tag{5}$$

$$Pbbt = Pbat + \Delta\phi \tag{6}$$

In Expression (6), $\Delta\phi$ represents a phase difference between the reception antennas obtained when the transmission waves transmitted from the transmission antennas 6a and 6b are combined and received by the reception antennas 7a and 7b. Further, in this situation, $\Delta$Pat and $\Delta$Pbt are represented by the following Expressions (7) and (8), respectively.

$$\Delta Pat = Paat - Pabt = Paat - (Paat + \Delta\theta) = -\Delta\theta \tag{7}$$

$$\Delta Pbt = Pbat - Pbbt = Pbat - (Pbat + \Delta\phi) = -\Delta\phi \tag{8}$$

It is found from Expressions (7) and (8) that $\Delta$Pat and $\Delta$Pbt do not have the same value.

On the other hand, consider a case where the transmission switch 5a is fixed to the off-state. In this case, in the transmission timing of the transmission antenna 6b, the transmission wave is normally transmitted from only the transmission antenna 6b. However, in the transmission timing of the transmission antenna 6a, the transmission wave is not transmitted from the transmission antenna 6a. Therefore, Paat, Pabt, Pbat, and Pbbt safisfy relationships of the following Expressions (9), (10), and (11).

$$Paat = \alpha \tag{9}$$

$$Pabt = \beta \tag{10}$$

$$Pbbt = Pbat + \Delta\phi \tag{11}$$

In Expressions (9) and (10), $\alpha$ and $\beta$ represent random angles caused by noise. Further, $\Delta$Pat and $\Delta$Pbt are represented by the following Expressions (12) and (13), respectively.

$$\Delta Pat = Paat - Pabt = \alpha - \beta \tag{12}$$

$$\Delta Pbt = Pbat - Pbbt = Pbat - (Pbat + \Delta\theta) = -\Delta\phi \tag{13}$$

It is found from Expressions (12) and (13) that $\Delta$Pat and $\Delta$Pbt do not have the same value.

As described above, ΔPat and ΔPbt as the phase differences between the reception antennas of the respective reception signals transmitted from the transmission antennas 6a and 6b and received by the reception antennas 7a and 7b are calculated. When an absolute value |ΔPat−ΔPbt| of the difference between the phase differences is equal to or larger than a given threshold value, it is judged that the transmission switches 5a and 5b have failed.

Subsequently, failure judgment processing in the radar apparatus according to the first embodiment of the present invention is described with reference to a flowchart of FIG. 3.

First, the failure judgment unit 14 reads, from the memory 12, the spectrums Faat, Fabt, Fbat, and Fbbt corresponding to the peak beat frequencies used in calculating the distance to the target and the relative velocity to the target (Step S31).

Subsequently, the failure judgment unit 14 calculates the phase components Paat, Pabt, Pbat, and Pbbt from the spectrums Faat, Fabt, Fbat, and Fbbt read from the memory 12 (Step S32).

Subsequently, the failure judgment unit 14 calculates ΔPat and ΔPbt as the phase differences between the reception antennas of the respective reception signals transmitted from the transmission antennas 6a and 6b, and received by the reception antennas 7a and 7b, from the following Expressions (14) and (15) (Step S33).

$$\Delta Pat = Paat - Pabt \quad (14)$$

$$\Delta Pbt = Pbat - Pbbt \quad (15)$$

Subsequently, the failure judgment unit 14 calculates an absolute value LPt of the difference between ΔPat and ΔPbt as the phase differences calculated in Step S33 through the following Expression (16) (Step S34).

$$\Delta Pt = |\Delta Pat - \Delta Pbt| \quad (16)$$

Subsequently, the failure judgment unit 14 judges whether or not the absolute value ΔPt of the difference calculated in Step S34 is equal to or larger than a given threshold value (Step S35).

Figure 3:
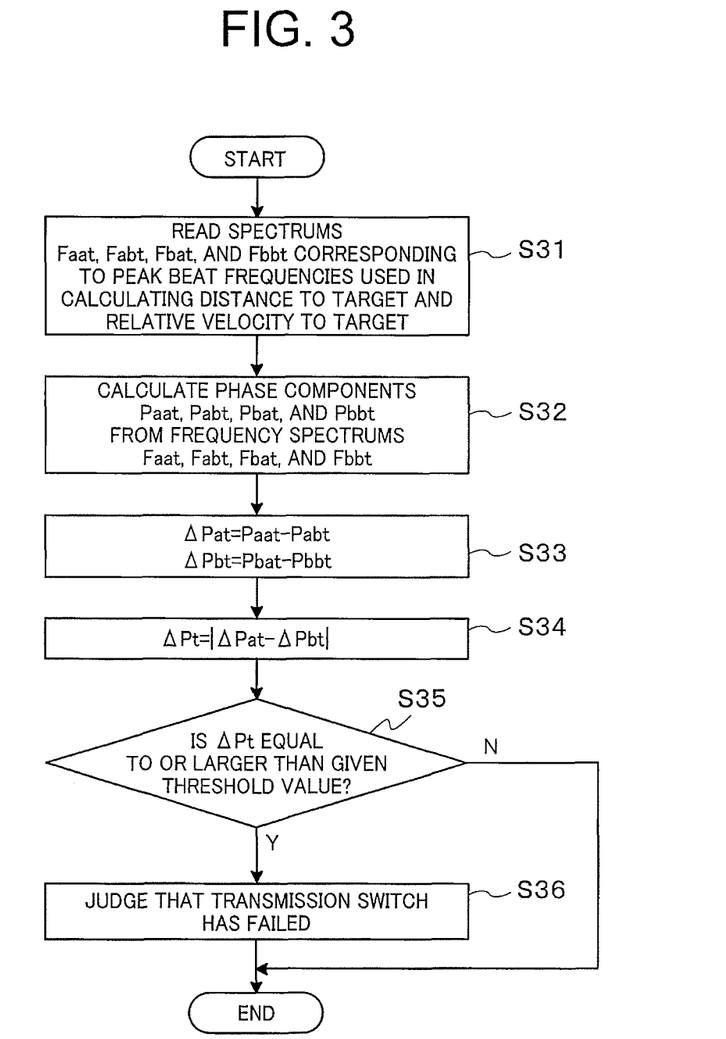
FIG. 3 is a flowchart illustrating failure judgment processing in the radar apparatus according to the first embodiment of the present invention.

In Step S35, when it is judged that the absolute value ΔPt of the difference is equal to or larger than the given threshold value (that is, Yes), the failure judgment unit 14 judges that the transmission switches 5a and 5b have failed (Step S36), gives notice of this judgment result, and completes the processing of FIG. 3.

On the other hand, in Step S35, when it is judged that the absolute value ΔPt of the difference is less than the given threshold value (that is, No), the failure judgment unit 14 immediately completes the processing of FIG. 3.

As described above, according to the first embodiment, the failure judgment unit compares the phase difference of the first reception signals transmitted from one transmission antenna and received by the plurality of reception antennas with the phase difference of the second reception signals transmitted from the other transmission antenna and received by the plurality of reception antennas. Then, the failure judgment unit judges the failure of the transmission switch for selecting the transmission antenna that transmits the electromagnetic wave based on the comparison results.

Therefore, the failure of the transmission switch can be detected.

In the first embodiment of the present invention, as the spectrums used for judging the failure of the transmission switches 5a and 5b, the spectrums Faat, Fabt, Fbat, and Fbbt corresponding to the peak beat frequencies used in calculating the distance to the target and the relative velocity to the target are used as an example. However, the present invention is not limited to this example, and a peak beat frequency corresponding to the target to which the relative velocity is 0 while a subject vehicle stops may be used.

In this case, the subject vehicle velocity is obtained from, for example, an engine control unit (ECU). In that case, the spectrum of the peak beat frequency can be obtained from the target that is determined to be a stationary object while the subject vehicle stops, and hence a possibility that the target is erroneously detected is reduced, and a judgment precision in the failure of the transmission switches 5a and 5b can be improved.

Figure 2:
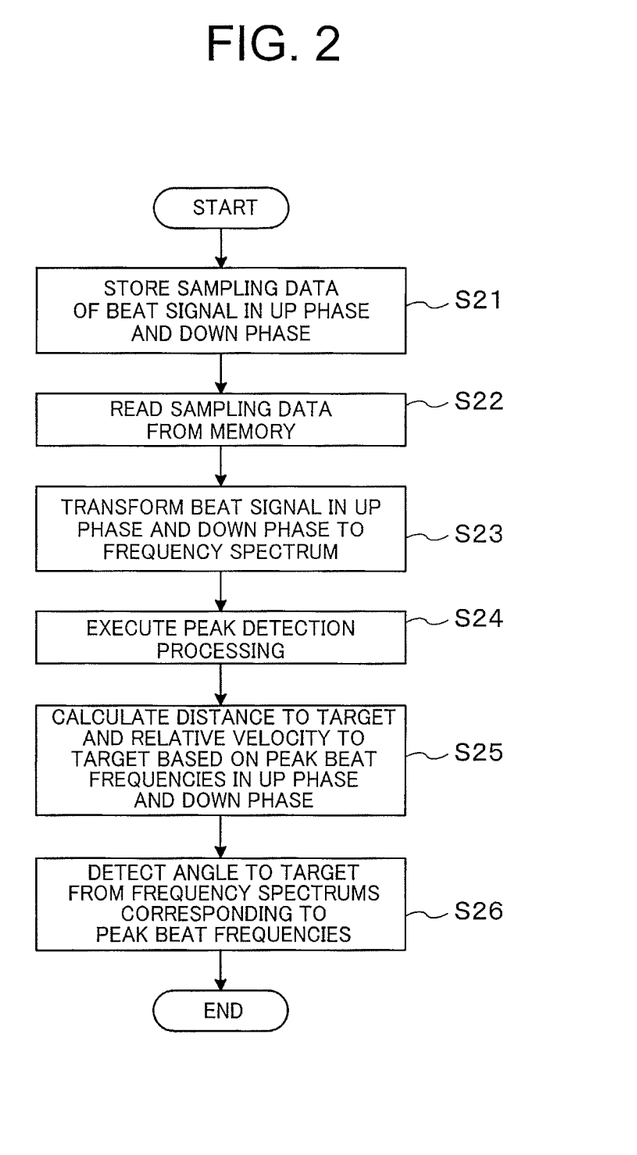
FIG. 2 is a flowchart illustrating processing of calculating a distance to a target, a relative velocity to the target, and an angle to the target in the radar apparatus according to the first embodiment of the present invention.

Further, instead of the spectrums Faat, Fabt, Fbat, and Fbbt corresponding to the peak beat frequencies used in calculating the distance to the target and the relative velocity to the target, frequency spectrums Faa[i], Fab[i], Fba[i], and Fbb[i], which are the results of the FFT and are calculated in Step S23 of FIG. 2, may be used, where i=0, 1, . . . , N−1, and N is an FFT point.

In this case, the failure judgment unit 14 compares phase components Paa[i], Pab[i], Pba[i], and Pbb[i] which are obtained when amplitude components Aaa[i], Aab[i], Aba[i], and Abb[i] of the frequency spectrums are equal to or larger than a given threshold value. The failure judgment unit 14 calculates LP[i], thereby judging the failure of the transmission switches 5a and 5b. Specifically, the failure judgment unit 14 calculates the following Expressions (17), (18), and (19), and judges the failure of the transmission switches 5a and 5b.

$$\Delta Pa[i] = Paa[i] - Pab[i] \quad (17)$$

$$\Delta Pb[i] = Pba[i] - Pbb[i] \quad (18)$$

$$\Delta P[i] = |\Delta Pa[i] - \Delta Pb[i]| \quad (19)$$

A plurality of phase components Paa[i], Pab[i], Pba[i], and Pbb[i] may be used for the judgement depending on the selection of threshold values of the amplitude components Aaa[i], Aab[i], Aba [i], and Abb [i]. In this case, a mean value of ΔP[i] with respect to the judgment target may be calculated, and if the mean value is equal to or larger than a given threshold value, it may be judged that the transmission switches 5a and 5b have failed. An influence of noise can be reduced by using the mean value.

Further, the failure judgment unit 14 calculates ΔP[imax] through Expressions (17), (18), and (19) with respect to the phase components Paa[imax], Pab[imax], Pba[imax], and Pbb[imax] corresponding to the spectrums having the maximum amplitude among the amplitude components Aaa[i], Aab[i], Aba[i], and Abb[i]. When ΔP[imax] is equal to or larger than a given threshold value, it may be judged that the transmission switches 5a and 5b have failed. By using the spectrums having the maximum amplitude for the judgment, the failure judgment based on the phase of the more accurate spectrum as the reflected wave can be executed, and the judgment precision of the failure of the transmission switches 5a and 5b can be improved.

Further, the failure judgment unit 14 calculates ΔP[i] with respect to all of the phase components Paa[i], Pab[i], Pba[i], and Pbb[i] to be compared. When all of ΔP[i] are equal to or larger than a given threshold value, the failure judgment unit 14 may judge that the transmission switches 5a and 5b have failed. By using a plurality of ΔP[i] for the judgment, the judgment precision of the failure of the transmission switches 5a and 5b can be improved.

Second Embodiment

A block diagram illustrating a radar apparatus according to a second embodiment of the present invention is the same as that illustrated in FIG. 1 according to the first embodiment. Therefore, the description thereof is omitted.

In the second embodiment, the amplitudes of the reception signals transmitted from the different transmission antennas 6a and 6b and received by the same reception antenna 7a or 7b are compared with each other in the peak beat frequencies used in calculating the distance to the target and the relative velocity to the target, thereby judging that the transmission switches 5a and 5b are fixed to the off-state.

Failure judgment processing in the radar apparatus according to the second embodiment of the present invention is described with reference to a flowchart of FIG. 4.

First, the failure judgment unit 14 reads, from the memory 12, the spectrums Faat, Fabt, Fbat, and Fbbt corresponding to the peak beat frequencies used in calculating the distance to the target and the relative velocity to the target (Step S41).

Subsequently, the failure judgment unit 14 calculates amplitudes Aaat, Aabt, Abat, and Abbt (frequency analysis signals) from the spectrums Faat, Fabt, Fbat, and Fbbt read from the memory (Step S42).

Subsequently, the failure judgment unit 14 calculates amplitude differences ΔAat and ΔAbt with respect to the respective reception signals transmitted from the different transmission antennas 6a and 6b, and received by the same reception antenna 7a or 7b, from the following Expressions (20) and (21) (Step S43).

$$\Delta Aat = |Aaat - Abat| \quad (20)$$

$$\Delta Abt = |Aabt - Abbt| \quad (21)$$

In this example, when the transmission switches 5a and 5b are normally turned on and off, the amplitudes Aaat, Aabt, Abat, and Abbt have substantially the same value, and the amplitude differences ΔAat and ΔAbt are smaller than a given threshold value. On the other hand, when the transmission switch 5a is fixed to the off-state, the received signals transmitted from the transmission antenna 6a and received by the reception antennas 7a and 7b do not exist, and hence Aaat and Aabt have amplitudes comparable to the noise. For that reason, the amplitude differences ΔAat and ΔAbt are equal to or larger than the given threshold value.

Subsequently, the failure judgment unit 14 judges whether or not the amplitude differences ΔAat and ΔAbt are both equal to or larger than the given threshold value (Step S44).

Figure 4:
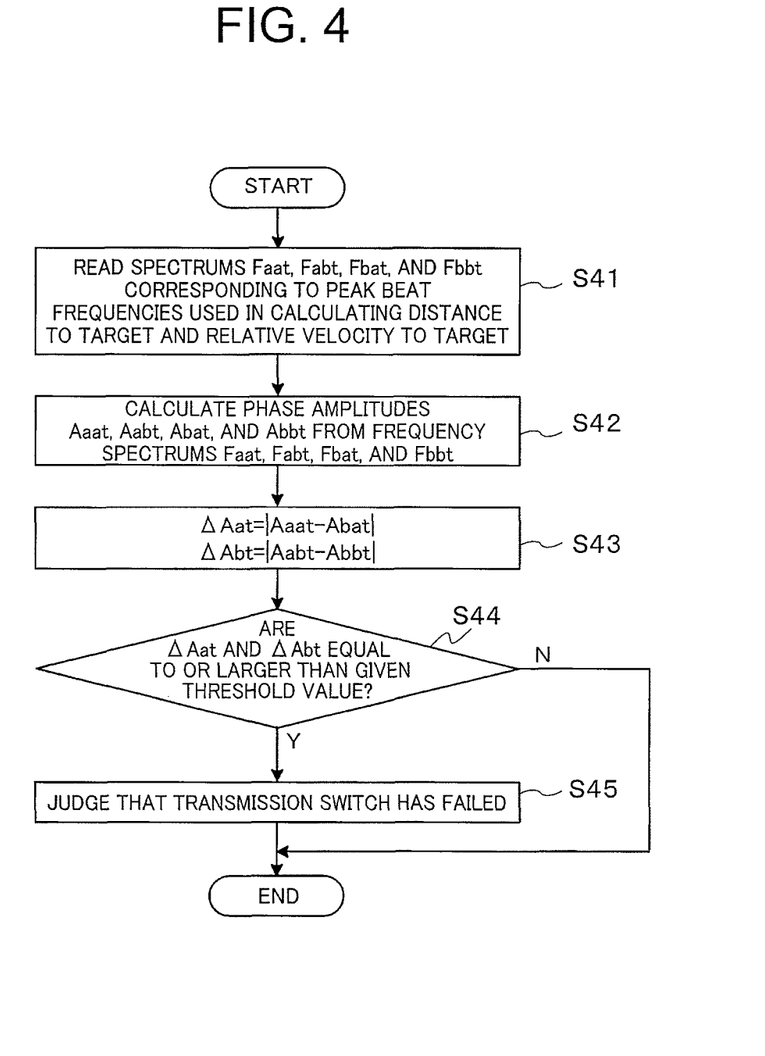
FIG. 4 is a flowchart illustrating failure judgment processing in the radar apparatus according to a second embodiment of the present invention.

In Step S44, when it is judged that the amplitude differences ΔAat and ΔAbt of the difference are both equal to or larger than the given threshold value (that is, Yes), the failure judgment unit 14 judges that the transmission switches 5a and 5b are fixed to the off-state (Step S45), gives notice of this judgment result, and completes the processing of FIG. 4.

On the other hand, in Step S44, when it is judged that at least one of the amplitude differences ΔAat and ΔAbt of the difference is less than the given threshold value (that is, No), the failure judgment unit 14 immediately completes the processing of FIG. 4.

As described above, according to the second embodiment, the failure judgment unit compares the amplitude of the first reception signals transmitted from one transmission antenna and received by the plurality of reception antennas with the amplitude of the second reception signals transmitted from the other transmission antenna and received by the plurality of reception antennas. Then, the failure judgment unit judges whether or not the transmission switch for selecting the transmission antenna that transmits the electromagnetic wave is fixed to the off-state based on the comparison results.

Therefore, the failure of the transmission switch can be detected.

In the second embodiment of the present invention, when both of ΔAat and ΔAbt are equal to or larger than the given threshold value, it is judged that the transmission switches 5a and 5b have failed. Alternatively, when the mean value of the amplitude differences ΔAat and ΔAbt is equal to or larger than the given threshold value, it may be judged that the transmission switches 5a and 5b have failed. The influence of noise can be reduced by using the mean value.

Further, in the second embodiment of the present invention, as the spectrums used for judging the failure of the transmission switches 5a and 5b, the spectrums Faat, Fabt, Fbat, and Fbbt corresponding to the peak beat frequencies used in calculating the distance to the target and the relative velocity to the target are used as an example. However, the present invention is not limited to this example, and a peak beat frequency corresponding to the target to which the relative velocity is 0 while a subject vehicle stops may be used.

In this case, the subject vehicle velocity is obtained from, for example, the ECU. In that case, the spectrum of the peak beat frequency can be obtained from the target that is determined to be a stationary object while the subject vehicle stops, and hence a possibility that the target is erroneously detected is reduced, and a judgment precision in the failure of the transmission switches 5a and 5b can be improved.

Further, instead of the spectrums Faat, Fabt, Fbat, and Fbbt corresponding to the peak beat frequencies used in calculating the distance to the target and the relative velocity to the target, the amplitude of the sampling data stored in Step S21 of FIG. 2 may be used.

Further, instead of the spectrums Faat, Fabt, Fbat, and Fbbt corresponding to the peak beat frequencies used in calculating the distance to the target and the relative velocity to the target, the frequency spectrums Faa[i], Fab[i], Fba[i], and Fbb[i] which are the results of the FFT, which are calculated in Step S23 of FIG. 2, may be used, where i=0, 1, ..., N-1, and N is the FFT point.

In this case, the failure judgment unit 14 compares the amplitude components Aaa[i], Aab[i], Aba[i], and Abb[i] of the frequency spectrums only when any one of the amplitude components is equal to or larger than a given threshold value. The failure judgment unit 14 calculates ΔAa[i] and ΔAb[i], thereby judging the failure of the transmission switches 5a and 5b. That is, the failure judgment unit 14 calculates the following Expressions (22) and (23), and judges the failure of the transmission switches 5a and 5b.

$$\Delta Aa[i] = |Aaa[i] - Aba[i]| \quad (22)$$

$$\Delta Ab[i] = |Aab[i] - Abb[i]| \quad (23)$$

A plurality of amplitudes may be used for the judgment depending on the selection of threshold values of the amplitude components Aaa[i], Aab[i], Aba[i], and Abb[i]. In this case, a mean value of the differences (Σ(ΔAa[i])/n or Σ(ΔAb[i])/n) with respect to the judgment target may be calculated, and if the mean value of the differences is equal to or larger than a given threshold value, it may be judged that the transmission switches 5a and 5b have failed. Here, n represents the number of i used for the comparison. An influence of noise can be reduced by using the mean value.

Further, the failure judgment unit 14 calculates ΔA[imax] and ΔAb[imax] through Expressions (22) and (23) with respect to the amplitude components Aaa[imax], Aab[imax], Aba[imax], and Abb[imax] corresponding to the spectrums having the maximum amplitude among the amplitude components Aaa[i], Aab[i], Aba[i], and Abb[i]. When ΔAa[imax] and ΔAb[imax] are equal to or larger than a given threshold value, it may be judged that the transmission switches 5a and 5b have failed. By using the spectrums having the maximum amplitude used for the judgment, the failure judgment based on the amplitude of the more accurate spectrum as the reflected wave can be executed, and the judgment precision of the failure of the transmission switches 5a and 5b can be improved.

Further, the failure judgment unit 14 calculates ΔAa[i] and ΔAb[i] with respect to all of the amplitude components Aaa[i], Aab[i], Aba[i], and Abb[i] to be compared. When all of ΔAa[i] and ΔAb[i] are equal to or larger than a given threshold value, the failure judgment unit 14 may judge that the transmission switches 5a and 5b have failed. By using a plurality of ΔAa[i] and ΔAb[i] for the judgment, the judgment precision of the failure of the transmission switches 5a and 5b can be improved.

Third Embodiment

A block diagram illustrating a radar apparatus according to a third embodiment of the present invention is the same as that illustrated in FIG. 1 according to the first embodiment. Therefore, the description thereof is omitted.

In the third embodiment, when ΔPt becomes equal to or larger than a given value continuously a given number of times, it is judged that the transmission switches 5a and 5b have failed.

Failure judgment processing in the radar apparatus according to the third embodiment of the present invention is described with reference to a flowchart of FIG. 5.

First, the failure judgment unit 14 initializes a failure judgment number Ne to 0. The processing from Step S52 to Step S56 is the same as that from Step S31 to S35 illustrated in FIG. 3, and hence the description thereof is omitted.

In Step S56, when it is judged that the absolute value ΔPt of the difference is equal to or larger than the given threshold value (that is, yes), the failure judgment unit 14 increments the failure judgment number Ne (Step S57).

On the other hand, in Step S56, when it is judged that the absolute value ΔPt of the difference is less than the given threshold value (that is, no), the failure judgment unit 14 shifts to Step S51, and initializes the failure judgment number Ne to 0.

Subsequently, the failure judgment unit 14 judges whether or not the failure judgment number Ne is equal to or larger than a given value (Step S58).

Figure 5:
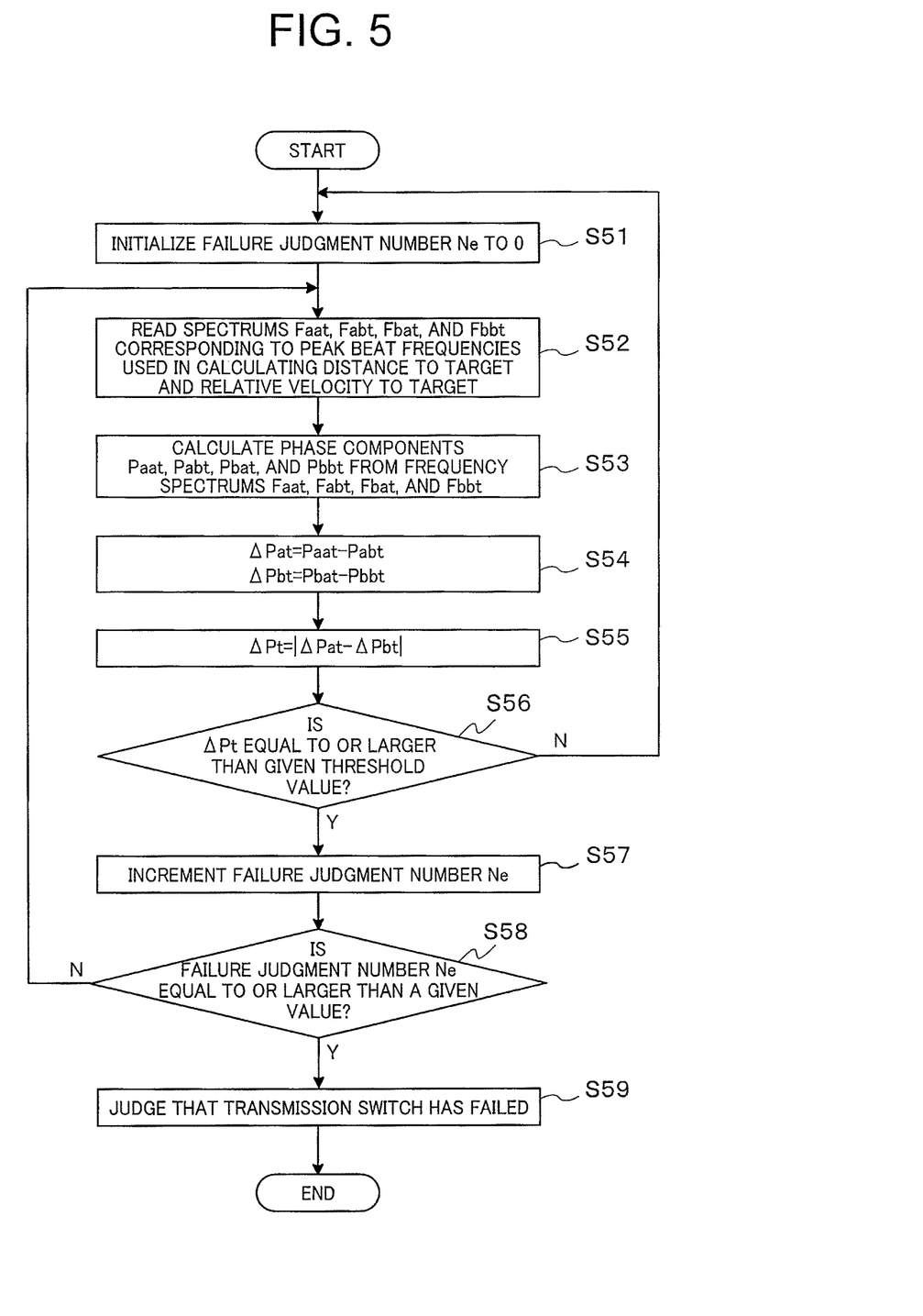
FIG. 5 is a flowchart illustrating failure judgment processing in the radar apparatus according to a third embodiment of the present invention.

In Step S58, when it is judged that the failure judgment number Ne is equal to or larger than the given value (that is, yes), the failure judgment unit 14 judges that the transmission switches 5a and 5b have failed (Step S59), gives notice of this judgment result, and completes the processing of FIG. 5.

On the other hand, in Step S58, when it is judged that the failure judgment number Ne is less than the given value (that is, no), the failure judgment unit 14 shifts to Step S52.

As described above, according to the third embodiment, when the failure condition for the transmission switch is satisfied continuously a given number of times, it is judged that the transmission switches have failed.

Therefore, the judgment precision of the failure of the transmission switches can be improved.

What is claimed is:

1. A radar apparatus, comprising:
a plurality of transmission antennas;
transmission switches that select a transmission antenna for transmitting an electromagnetic wave from among the plurality of transmission antennas;
a plurality of reception antennas that receive a reflected wave which is the electromagnetic wave reflected from a target as reception signals;
a signal processing unit that detects the target based on a sampling signal obtained by sampling the reception signals; and
a failure judgment unit that compares first reception signals among the reception signals, the first reception signals being transmitted from the selected transmission antenna and received by the plurality of reception antennas, with second reception signals among the reception signals, the second reception signals being transmitted from another of the plurality of transmission antennas and received by the plurality of reception antennas, and judges whether or not any one of the transmission switches has failed based on a comparison result,
wherein the failure judgment unit judges that the any one of the transmission switches has failed when a difference between a first phase difference between the first reception signals and a second phase difference between the second reception signals is equal to or larger than a first given threshold value.

2. A radar apparatus according to claim 1,
wherein the first reception signals and the second reception signals comprise frequency analysis signals used when the signal processing unit detects the target, and
wherein the failure judgment unit compares the first phase difference related to the reception signals received by an arbitrary two of the plurality of reception antennas among the first reception signals, with the second phase difference related to the reception signals received by the same arbitrary two of the plurality of reception antennas that receive the first reception signals from among the second reception signals.

3. A radar apparatus according to claim 2, wherein the failure judgment unit compares the first phase difference with the second phase difference, the first phase difference and the second phase difference being related to the target that is judged to be a stationary object according to a target detection result of the signal processing unit while a subject vehicle stops.

4. A radar apparatus according to claim 1,
wherein the first reception signals and the second reception signals comprise frequency analysis signals each having an amplitude equal to or larger than a second given threshold value, and
wherein the failure judgment unit compares the first phase difference related to the reception signals received by an arbitrary two of the plurality of reception antennas among the first reception signals, with the second phase difference related to the reception signals received by the same arbitrary two of the plurality of reception antennas that receive the first reception signals from among the second reception signals.

5. A radar apparatus according to claim 4, wherein the failure judgment unit judges that the any one of the transmission switches has failed when a mean value of differences between the first phase difference and the second phase difference among a plurality of the frequency analysis signals each having the amplitude equal to or larger than the second given threshold value is equal to or larger than the first given threshold value.

6. A radar apparatus according to claim 4, wherein the failure judgment unit judges that the any one of the transmission switches has failed when a difference between the first phase difference and the second phase difference of a frequency analysis signal having a maximum amplitude among a plurality of the frequency analysis signals each having the amplitude equal to or larger than the second given threshold value is equal to or larger than the first given threshold value.

7. A radar apparatus according to claim 4, wherein the failure judgment unit judges that the any one of the transmission switches has failed when differences between the first phase difference and the second phase difference which are related to each of a plurality of the frequency analysis signals each having the amplitude equal to or larger than the second given threshold value are all equal to or larger than the second given threshold value.

8. A radar apparatus according to claim 1,
wherein the first reception signals and the second reception signals comprise frequency analysis signals used when the signal processing unit detects the target, and
wherein the failure judgment unit compares a first amplitude of the first reception signals with a second amplitude of the second reception signals, the first reception signals and the second reception signals being related to the reception signals received by the same reception antenna.

9. A radar apparatus according to claim 8, wherein the failure judgment unit compares the first amplitude with the second amplitude, the first amplitude and the second amplitude being related to the target that is judged to be a stationary object according to a target detection result of the signal processing unit while a subject vehicle stops.

10. A radar apparatus according to claim 8, wherein the failure judgment unit judges that the any one of the transmission switches has failed when a difference between the first amplitude and the second amplitude is equal to or larger than a third given threshold value for all of the plurality of reception antennas.

11. A radar apparatus according to claim 8, wherein the failure judgment unit judges that the any one of the transmission switches has failed when a mean value of differences between the first amplitude and the second amplitude is equal to or larger than a third given threshold value for all of the plurality of reception antennas.

12. A radar apparatus according to claim 1,
wherein the first reception signals and the second reception signals comprise the sampling signal, and
wherein the failure judgment unit compares a first amplitude of the first reception signal with a second amplitude of the second reception signal, the first reception signal and the second reception signal being related to the reception signals received by the same reception antenna.

13. A radar apparatus according to claim 12, wherein the failure judgment unit judges that the any one of the transmission switches has failed when a difference between the first amplitude and the second amplitude is equal to or larger than a third given threshold value for all of the plurality of reception antennas.

14. A radar apparatus according to claim 12, wherein the failure judgment unit judges that the any one of the transmission switches has failed when a mean value of differences between the first amplitude and the second amplitude is equal to or larger than a third given threshold value for all of the plurality of reception antennas.

15. A radar apparatus according to claim 1,
wherein the first reception signals and the second reception signals comprise frequency analysis signals each having an amplitude equal to or larger than a second given threshold value, and
wherein the failure judgment unit compares a first amplitude of the first reception signal with a second amplitude of the second reception signal, the first reception signal and the second reception signal being related to the reception signals received by the same reception antenna.

16. A radar apparatus according to claim 15, wherein the failure judgment unit judges that the any one of the transmission switches has failed when a difference between the first amplitude and the second amplitude is equal to or larger than a third given threshold value for all of the plurality of reception antennas.

17. A radar apparatus according to claim 15, wherein the failure judgment unit judges that the any one of the transmission switches has failed when a mean value of differences between the first amplitude and the second amplitude is equal to or larger than a third given threshold value for all of the plurality of reception antennas.

18. A radar apparatus according to claim 15, wherein the failure judgment unit judges that the any one of the transmission switches has failed when a mean value of differences between the first amplitude and the second amplitude among a plurality of the frequency analysis signals each having the amplitude equal to or larger than the second given threshold value is equal to or larger than a third given threshold value.

19. A radar apparatus according to claim 15, wherein the failure judgment unit judges that the any one of the transmission switches has failed when a difference between the first amplitude and the second amplitude of the frequency analysis signal having a maximum amplitude among a plurality of the frequency analysis signals each having the amplitude equal to or larger than the second given threshold value is equal to or larger than a third given threshold value.

20. A radar apparatus according to claim 15, wherein the failure judgment unit judges that the any one of the transmission switches has failed when differences between the first amplitude and the second amplitude which are related to each of a plurality of the frequency analysis signals each having the amplitude equal to or larger than the second given threshold value are all equal to or larger than a third given threshold value.

21. A radar apparatus according to claim 1, wherein the failure judgment unit judges that the any one of the transmission switches has failed when failure judgment for the transmission switches is executed continuously a given number of times.

* * * * *